United States Patent [19]

Frank

[11] Patent Number: 5,306,042
[45] Date of Patent: Apr. 26, 1994

[54] AIR BAG DEPOLYMENT CONTROL

[75] Inventor: Frederick W. Frank, Tipp City, Ohio

[73] Assignee: General Motors Corporation, Detroit, Mich.

[21] Appl. No.: 907,520

[22] Filed: Jul. 6, 1992

[51] Int. Cl.⁵ .............................................. B60R 21/16
[52] U.S. Cl. ................................. 280/728 B; 280/732
[58] Field of Search ................ 280/728 A, 728 B, 732

[56] References Cited

U.S. PATENT DOCUMENTS

| 3,708,179 | 1/1973 | Hulten | 280/732 |
| 5,035,444 | 7/1991 | Carter | 280/728 B |
| 5,135,257 | 8/1992 | Suran et al. | 280/732 |

FOREIGN PATENT DOCUMENTS

| 0364714 | 4/1990 | European Pat. Off. | 280/728 |
| 3-258636 | 11/1991 | Japan | 280/730 |

Primary Examiner—Margaret A. Focarino
Assistant Examiner—Paul Dickson
Attorney, Agent, or Firm—Charles E. Leahy

[57] ABSTRACT

An air bag assembly is mounted in a vehicle instrument panel recess located below an opening in the instrument panel upper surface which has a removable cover door normally closing the opening. The air bag assembly comprises an inflator, an air bag, and a container for housing the air bag and inflator and having a deployment opening. A deflection shield closes the container opening and comprises a deflector panel, a front flap overlying the front of the container, and a pair of side flaps which overlie the container sides. The side flaps include two spaced arcuate slots which receive shoulder bolts mounted on the container sides. Upon actuation of the inflator, the air bag inflates and forces the deflector shield upward to force open the cover door. The inflating air bag moves the shield upward to a position spaced above the instrument panel. The deflector panel and the side and front flaps form a deployment chute which directs deployment of the inflating air bag rearwardly of the instrument panel. The deflection shield also serves as a protective closure for the air bag container to protect the air bag during handling prior to vehicle installation.

3 Claims, 3 Drawing Sheets

AIR BAG DEPOLYMENT CONTROL

BACKGROUND OF THE INVENTION

This invention relates generally to vehicle air bag installations and, more particularly, to a device for controlling deployment of an air bag.

Inflatable occupant restraint systems for passengers of vehicles conventionally comprise an air bag assembly having an inflatable air bag, an inflator and a container for housing the inflator and the air bag. The air bag is folded atop the inflator beneath the open top of the container. This assembly is mounted in a recess in the instrument panel for deployment of the air bag through a deployment opening in the instrument panel. This opening is closed by a cover door.

The instrument panel opening can be located in the front face of the instrument panel or in the upper surface of the panel. Positioning of this opening in the front face of the instrument panel complicates location of the glove box. Consequently, it is more convenient to locate this opening in the upper surface of the instrument panel.

In some vehicles the air bag cover door comprises a foam pad and skin which are an integral portion of the panel. A supporting substrate is cut out to define the door shape. Upon deployment, the inflating air bag forces a door-shaped cutter to rip through the panel foam and skin to release the inflating air bag.

In other vehicles the skin includes a tear seam line of weakened panel material along the substrate cutout on three sides to define the door. This tear seam is fractured by the inflating air bag so that the door swings open about its fourth side, which functions as a hinge, to enable the air bag to properly deploy.

In yet other vehicles this cover door is a separate rectangular panel that is flush mounted in a rectangular opening in the surrounding panel area so that it can be opened and completely removed by the deploying air bag upon inflation. This type of door is usually attached to the instrument panel at its forward edge by a hinge or by a tethering device to cause the door to swing open about this attachment out of the path of the deploying air bag.

It is essential that this type of door be releasably installed in the panel opening so that it completely separates and moves out of the way of the deploying air bag. However, the door must remain attached to the instrument panel upon opening so that it does not become a hazard to occupant safety.

Upon actuation of the inflator, the air bag begins inflating and exerts an increasing force on the cover door, bursting it open with considerable force. The bag then unfolds and inflates in a manner partially determined by how the bag was originally folded, by the location of the instrument panel deployment opening, and by the location of the cover door when open.

With the opening located in the upper surface of the instrument panel, the inflating air bag must deploy initially upwardly and must then deploy rearwardly. Many different methods of folding the air bag have been devised to tailor air bag deployment to a particular vehicle environment. Also, devices have been developed which locate the cover door in a desired position when opened. One of these includes front and side tethers which locate the cover door in a position spaced above the instrument panel and spaced from the windshield. These tethers and the door create a chute which directs deployment of the inflating air bag from the initial vertical movement to rearward movement. These tethers must be quite strong to resist the force exerted continuously by the inflating air bag.

The inflator is first mounted in the container and the air bag is attached and hand folded into the container to form the air bag assembly. Since the air bag assembly is normally transported and handled several times prior to installation in a vehicle, a protective cover is then attached over the container opening to cover the air bag. Since the air bag must deploy through this cover, it must be sufficiently flimsy to be easily burst open by the inflating air bag.

It would be desirable to provide an air bag assembly which provides a deployment chute to direct air bag deployment rearward that does not require that the cover door have side tethers.

It would also be desirable to provide an air bag assembly which does not require the cover door and its tethers to bear the continual force exerted by the deploying air bag.

It would be further desirable to provide an air bag assembly which includes a rigid air bag cover to protect the air bag during pre-installation handling.

SUMMARY OF THE INVENTION

It is therefore an object of this invention to provide an air bag assembly which provides a deployment chute to direct air bag deployment rearward that does not require that the cover door have side tethers.

Another object of this invention is to provide an air bag assembly which does not require the cover door and its tethers to bear the continual force exerted by the deploying air bag.

Yet another object of this invention is to provide an air bag assembly which includes a rigid air bag cover to protect the air bag during pre-installation handling.

In one aspect, this invention features a deflection shield for controlling deployment of an air bag which is housed in a container mounted in an instrument panel recess beneath a deployment opening. The deflection shield comprises a deflector panel movable between a stored position and an open position forming a deployment chute for directing deployment of the air bag rearwardly of the instrument panel.

In another aspect, this invention features a deflector panel which closes the container deployment opening in stored position and extends through the instrument panel deployment opening in open position to define the deployment chute.

Preferably, the deflection shield includes front and side flaps depending from the deflector panel and overlying the front and sides of the container in closed position and closing the space between the deflector panel and the container in open position to prevent forward and sideward deployment of the air bag, an arcuate slot formed on each side flap, and a stud mounted on each container side and received in each slot to control opening movement of the deflector panel.

In yet another aspect, this invention features an air bag module for installation in a vehicle, comprising an inflator, an air bag, a container for the air bag and inflator and having a generally rectangular air bag deployment opening, a closure panel for the opening, and means mounting the panel on the container for movement between a position closing the said opening and a position spaced from said opening and defining a deployment chute for the air bag.

These and further objects and features of this invention will become more readily apparent upon reference to the following detailed description of a preferred embodiment, as illustrated in the accompanying drawings, in which:

DETAILED DESCRIPTION OF A PREFERRED EMBODIMENT

Figure 1:
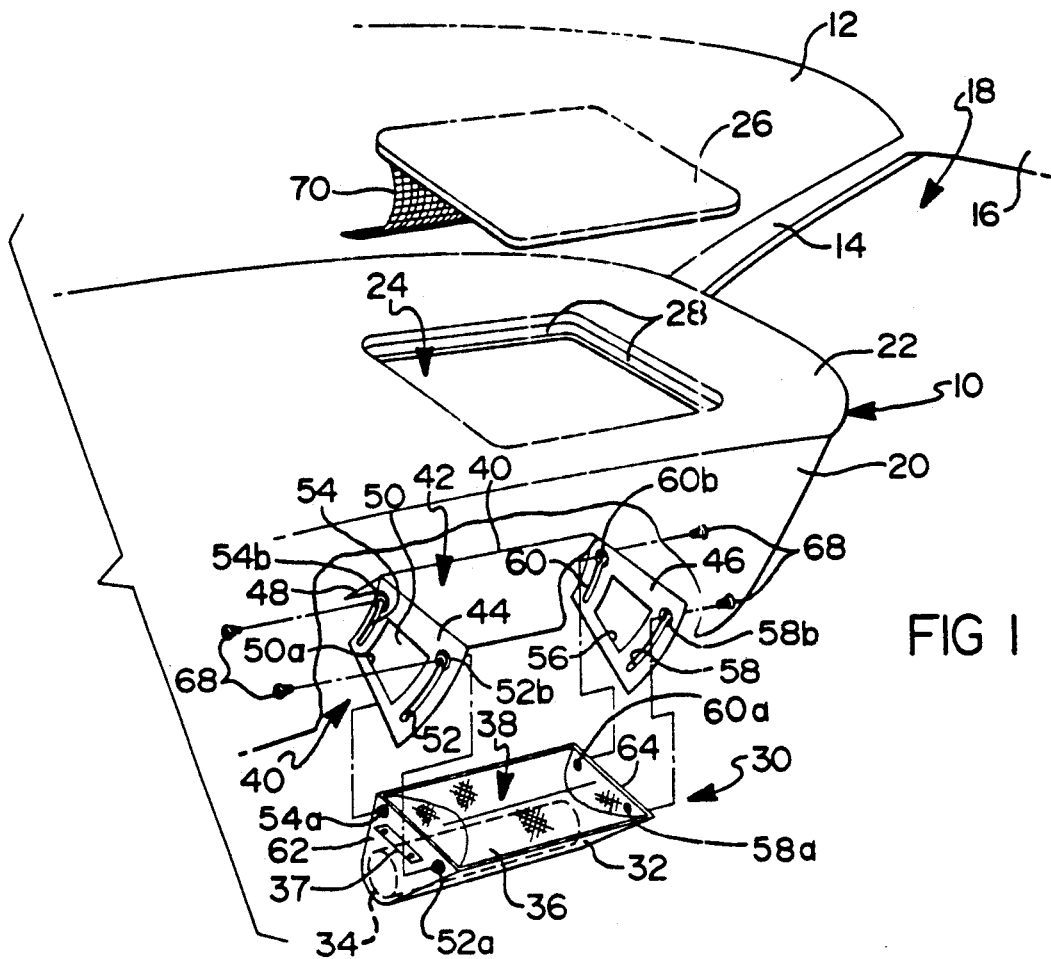
FIG. 1 is an exploded partial perspective view of a vehicle instrument panel having an air bag assembly, according to this invention, installed in a recess below an opening.

Referring now to FIG. 1, a vehicle passenger compartment has an instrument panel 10 that is bounded by a windshield 12, an "A" pillar 14, and a roof 16 which frame a passenger door opening 18. Instrument panel 10 comprises a vertical front panel 20 and a substantially horizontal top panel 22 having an air bag deployment opening 24.

Figure 3:
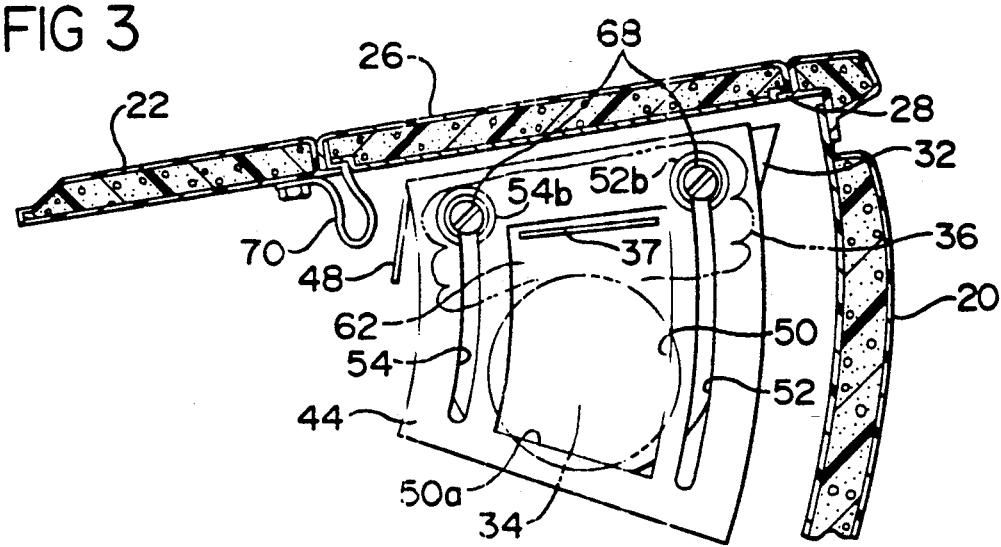
FIG. 3 is a longitudinal sectional view of the air bag assembly of FIG. 2, showing the assembly prior to air bag deployment.

A cover door 26 normally closes deployment opening 24, as shown in FIG. 3. The instrument panel and cover door are illustrated as comprising a conventional vinyl-covered foam-over-substrate construction. In closed position, door 26 engages a peripheral flange 28 flanking opening 24 and has its exterior surface flush with the surrounding panel 22.

Figure 2:
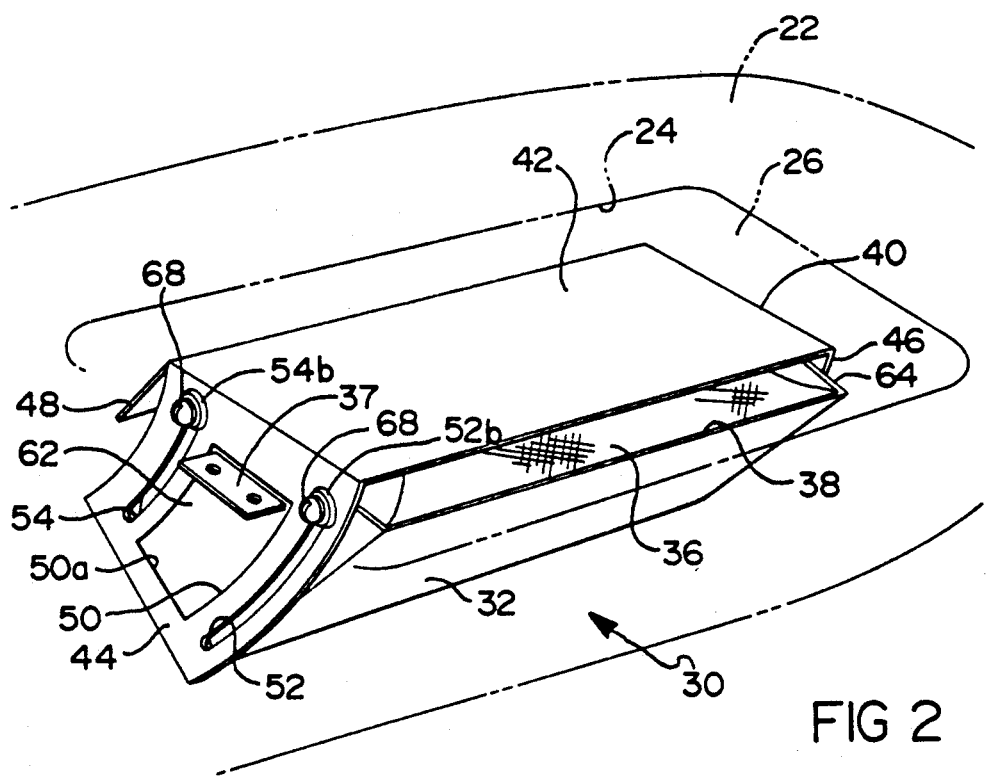
FIG. 2 is an enlarged detail view of the air bag assembly of FIG. 1.

Referring also to FIG. 2, an air bag assembly 30 comprises a container 32, an inflator 34 and an air bag 36. Inflator 34 and air bag 36 are housed in container 32, which includes apertured side mounting flanges 37 (only one shown) for mounting the assembly 30 to conventional instrument panel support structure, not shown. Inflator 34 is a conventional cylindrical device which generates pressure gas when actuated by a control signal supplied by a vehicle-mounted sensor (not shown) in a well-known manner. The generated pressure gas inflates air bag 36 for deployment through rectangular opening 38 in the top of container 32 into the passenger compartment rearward of instrument panel 10, as later described.

Air bag assembly 30 further includes a deflector shield 40 which overlies container opening 38. Deflector shield 40 comprises a rectangular deflector panel 42, depending side flaps 44 and 46, and a front flap 48. Side flap 44 contains a central arcuate aperture 50, which is flanked by a pair of arcuate slots 52 and 54. Similarly, flap 46 contains a central aperture 56 flanked by a pair of arcuate slots 58 and 60.

Sides 62 and 64 of container 32 have stamped threaded bosses 52a, 54a, 58a, 60a at the ends of slots 52, 54, 58 and 60 which receive shoulder bolts 68 that project through the slots to secure deflector shield 40 to container 32. When shoulder bolts 68 are attached as shown, they form studs which cooperate with slots 52, 54, 58 and 60 to control arcuate movement of deflector shield 40 between the positions of FIG. 3 and FIG. 4. Mounting flanges 37 project through apertures 50 and 56, which enable this movement of deflector shield 40. Engagement of mounting flanges 37 with the bottoms 50a and 58a of apertures 50 and 58 position the panel 42 in the open position.

Bosses 52b, 58b and 60b are stamped outwardly of the side flaps 44 and 46 at the upper ends of slots 52, 54, 58 and 60. These bosses are frictionally engaged by the heads of shoulder bolts 68 to provide a frictional force maintaining the shield in closed position. This covers and protects air bag 36 during handling of the assembly 30 prior to installation in a vehicle. When the heads of bolts 68 disengage bosses 52b, 54b, 58b and 60b, the shanks will slide freely in slots 52, 54, 58 and 60.

Upon installation in a vehicle, air bag assembly 30 will be as depicted in FIG. 3, located beneath deployment opening 24 in instrument panel 22. Opening 24 is closed by cover door 26, which is connected to panel 22 at its forward end by a tether 70, in a well-known manner. Upon actuation of inflator 34, air bag 36 will begin inflating, exerting an upward force on de shield 40. This causes bosses 52b, 54b, 58b and 60b to disengage the heads of bolts 68 as panel 42 engages cover door 26.

As air bag 36 inflates further, cause panel 42 to pop open cover door 26 and move deflector shield 40 upward along an arcuate path controlled by the bolts 68 and slots 52, 54, 58 and 60. This upward movement will continue until aperture bottom edges 50a and 58a engage mounting flanges 37. This interengagement of surfaces will locate the deflector shield 40 in the open position illustrated in FIG. 4. In this position, the side and front panels 44, 46 and 48 of deflector shield 40 block sideward and frontward deployment of air bag 36.

Figure 4:
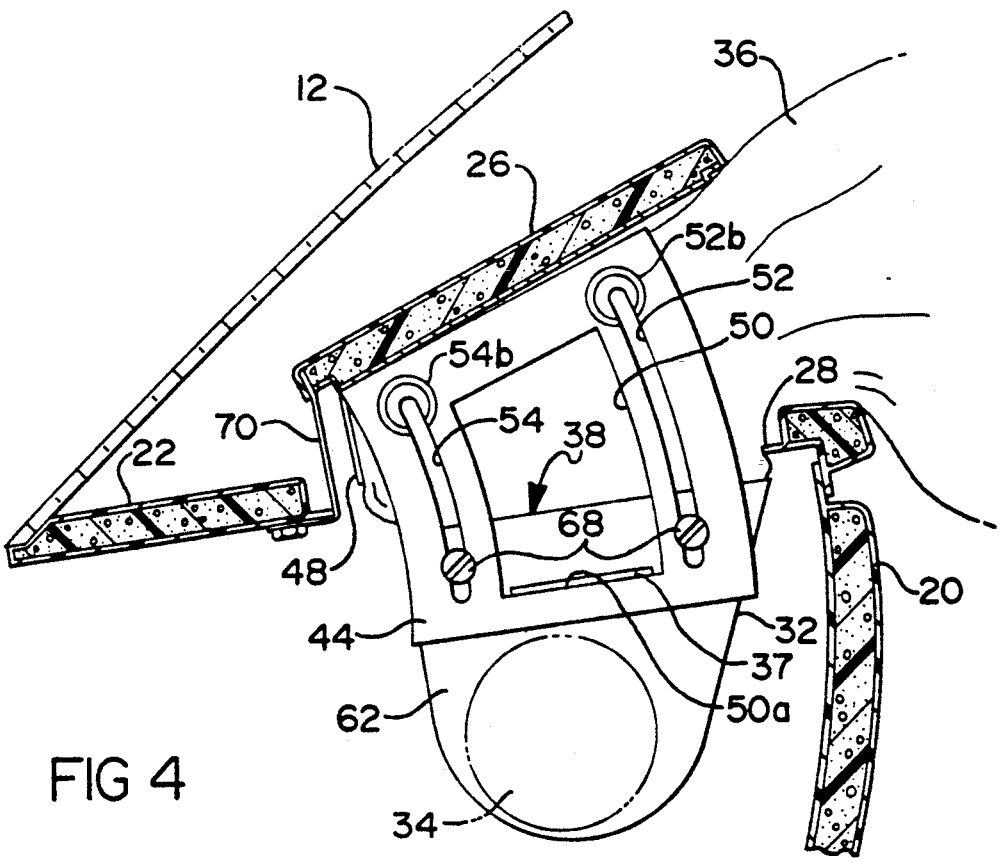
FIG. 4 is a view similar to FIG. 3, showing the assembly during air bag deployment.
Figure 5:
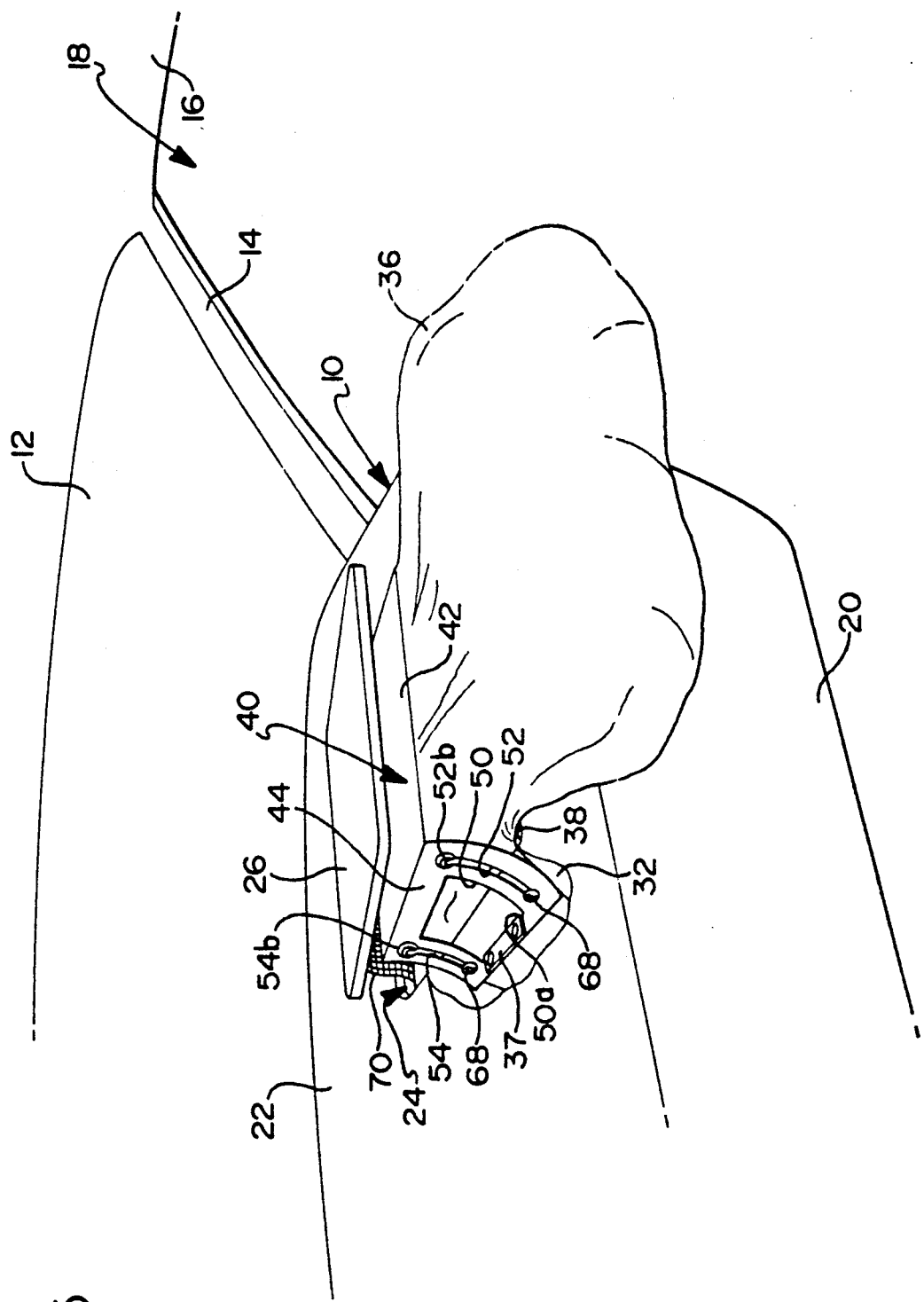
FIG. 5 is a partial perspective view of a vehicle instrument panel having an air bag assembly, according to this invention, installed in a recess below an opening, showing the assembly during air bag deployment, and partially cut away to show details of construction.

In the open position of FIGS. 4 and 5, deflector shield 40 forms a chute which deflects the upward movement of air bag 36 and directs deployment of the air bag rearward of instrument panel 10, as illustrated in FIG. 5. All forces exerted by air bag 36 will be absorbed by deflector shield 40. Since there is no sustained force exerted on the cover door, the opening movement of door 26 will be restrained by tether 70, which need only be strong enough to maintain the cover door 26 attached to instrument panel 22.

Thus, the deflector shield serves as a protective cover for the air bag, which facilitates handling of the air bag assembly prior to vehicle installation. It also provides a deployment chute for redirecting deployment of the air bag from upward to rearward, and minimizes the force exerted on the cover door by the inflating air bag.

While only a preferred embodiment has been illustrated and described, obvious modifications thereof are contemplated within the scope of this invention and the following claims.

I claim:

1. In a vehicle instrument panel having a recess for mounting an air bag assembly located below an opening, and a removable cover door for normally closing the opening, wherein the air bag assembly comprises an inflator, an air bag, and a container for housing the air bag and inflator and having a deployment opening, the improvement comprising a deflection shield for controlling air bag deployment comprising a deflector panel mounted on the container of the air bag assembly and generally underlying the removable cover door of the instrument panel and movable between a stored position and an open position forming a deployment chute for directing deployment of the air bag rearwardly of the instrument panel, the deflector panel closing the container deployment opening in the stored position and moving upwardly through said instrument panel opening to the open position opening the container deployment opening, and the deflection shield including front and side flaps depending from the deflector panel and overlying the front and sides of the container in the stored position and closing the space between the deflector panel and the container in the open position to prevent forward and sideward deployment of the air bag.

2. In a vehicle instrument panel having a recess for mounting an air bag assembly located below an opening, and a removable cover door for normally closing the opening, wherein the air bag assembly comprises an inflator, an air bag, and a container for housing the air bag and inflator and having a deployment opening, the improvement comprising a deflection shield for controlling air bag deployment comprising a deflector panel mounted on the container of the air bag assembly and generally underlying the removable cover door of the instrument panel and movable between a stored position and an open position forming a deployment chute for directing deployment of the air bag rearwardly of the instrument panel, the deflection shield including a side flap depending from each side of the deflector panel flanking the container in the stored position for limiting sideward deployment of the air bag and a front flap depending from the front of the deflector panel overlying the front of the container in the stored position for limiting forward deployment of the air bag, the deflection shield including cooperating means on the side flaps and on the container for controlling opening movement of the deflector panel, the cooperating means including an arcuate slot on each side flap and a stud on the container received in each slot, and the deflector panel closing the container deployment opening in the stored position and moving upwardly through the instrument panel deployment opening to a position opening the container deployment opening in the open position.

3. An air bag module for installation in a vehicle, comprising an inflator, an air bag, a container for the air bag and inflator and having a generally rectangular air bag deployment opening, a closure panel for the opening, means mounting the panel on the container for movement between a position closing said opening and a position spaced from said opening and defining a deployment chute for the air bag, a side flap depending from each side of the closure panel flanking the container in the closed position for limiting sideward deployment of the air bag, and cooperating means on the side flaps and on the container controlling opening movement of the closure panel and including an arcuate slot on each flap and a stud on the container received in each slot.

* * * * *